UNITED STATES PATENT OFFICE.

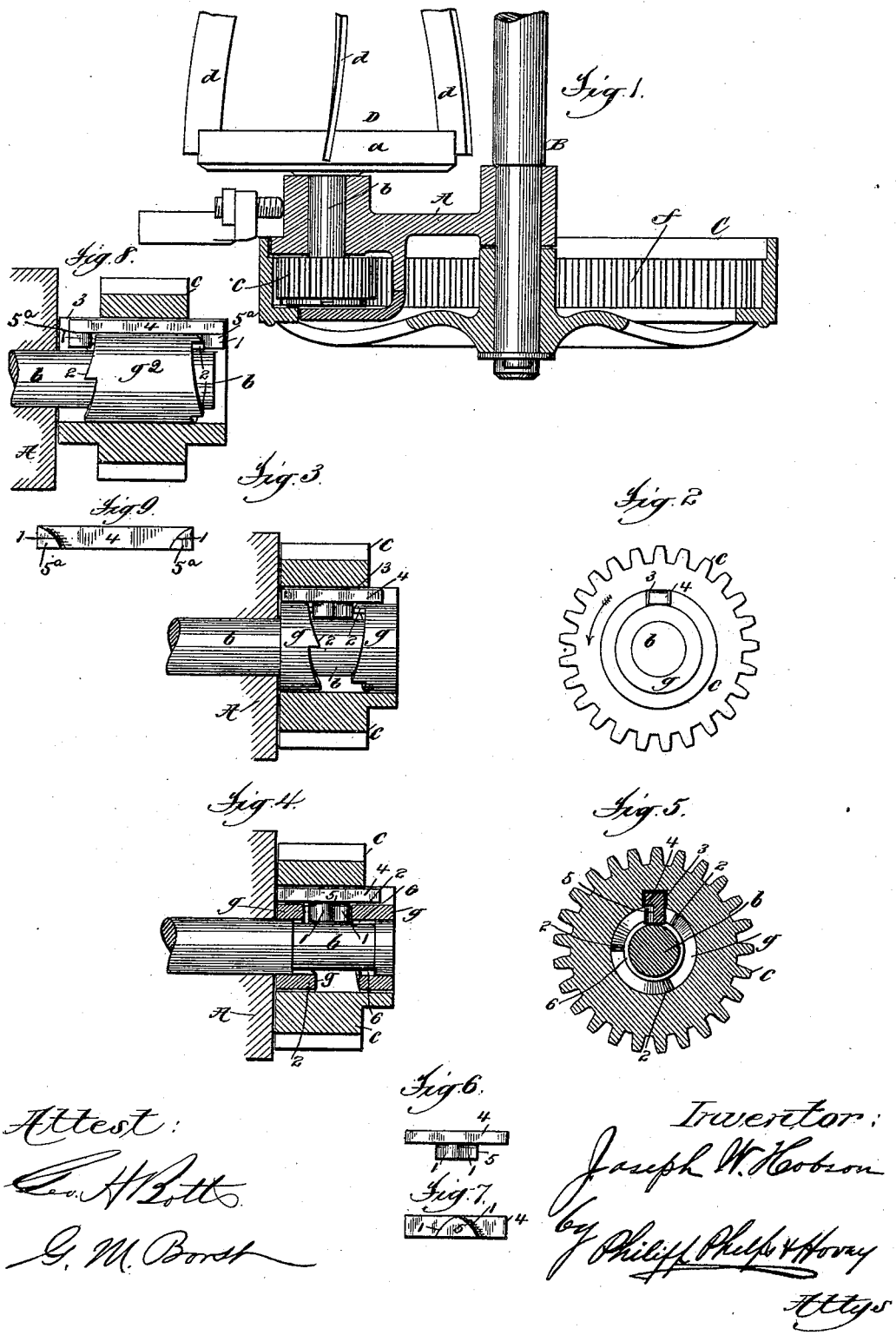

JOSEPH W. HOBSON, OF BERGEN POINT, NEW JERSEY.

PAWL-AND-RATCHET CLUTCH MECHANISM.

SPECIFICATION forming part of Letters Patent No. 397,802, dated February 12, 1889.

Application filed February 7, 1888. Serial No. 263,204. (No model.)

*To all whom it may concern:*

Be it known that I, JOSEPH W. HOBSON, a citizen of the United States, residing at Bergen Point, county of Hudson, and State of New Jersey, have invented certain new and useful Improvements in Pawl-and-Ratchet Clutch Mechanism, fully described and represented in the following specification and the accompanying drawings, forming a part of the same.

The invention relates to a pawl-and-ratchet clutch mechanism which is designed for use in those cases where it is desirable to transmit the motion of a revolving gear or pulley to its arbor or axis when the former is moving in one direction, but to allow the arbor to remain idle when the gear or pulley is moving in the opposite direction.

Clutch mechanisms of this character are desirable in many classes of machinery; but one important application of such a mechanism is found in lawn-mowers, in which it is necessary to impart motion to the shaft of the cutter when the machine is moving forward, but is desirable to allow the cutter to remain idle when the machine is moved backward.

The invention is therefore illustrated in the present case as applied to a lawn-mower, this being one of the more important uses to which it is applicable.

In the accompanying drawings, Figure 1 is a horizontal section of a portion of the principal parts of a lawn-mower, showing the invention applied thereto. Fig. 2 is an end view of the clutch mechanism. Figs. 3, 4, and 5 are sectional views illustrating the construction and operation of the clutch mechanism. Figs. 6 and 7 are views of the pawl detached from the other parts. Figs. 8 and 9 are views similar to Figs. 3 and 7, illustrating a modification, which will be hereinafter referred to.

Referring to said figures, it is to be understood that A represents one of the side frames of a lawn-mower; B, the axle of the machine, upon which the driving-wheels C (only one of which is shown) are mounted.

D represents the cutter, consisting of a number of spirally-arranged blades, $d$, supported in suitable heads, $a$, having shafts or journals $b$, which are mounted to turn in bearings in the frame A. One or both of the journals $b$ is or are provided with a gear, $c$, which engages with an internal gear, $f$, formed around the inner periphery of the driving-wheel C, these parts being so arranged that when the machine is moved forward the motion imparted from the driving-wheel will revolve the cutter in the proper direction. The gear $c$ is mounted loosely upon its arbor formed by the journal $b$, and the gear and arbor are provided with a pawl-and-ratchet clutch mechanism by which the motion of the gear is imparted to the arbor when the former is revolved in one direction—that is to say, when the machine is moving forward—but operates to allow the gear to turn freely about the arbor without imparting its motion thereto when it is revolved in the reverse direction—that is to say, when the machine is moved backward. For this purpose the arbor is provided around its circumference with a ratchet or ratchets having teeth 2, the engaging-faces of which lie parallel with the arbor—that is, so as to engage with a pawl which moves parallel with the arbor, and are so arranged as to alternate with each other—that is to say, the teeth of one ratchet lie opposite the recesses of the other, and vice versa.

The gear or other wheel $c$ is fitted to turn freely on the arbor, and its opening which receives the arbor is provided on one side with a recess, 3, which is parallel with the arbor, and into which is fitted a sliding pawl, 4, having an inward projection or projections, 5 or $5^a$, which form teeth to engage with the ratchet-teeth 2. The teeth of the pawl are made square upon one face, but are inclined in opposite directions upon the other, so as to pass over the ratchet-teeth when moved in one direction, but engage with them when moved in the opposite direction. The ratchet-teeth 2 are formed upon the edges of a ferrule fitted onto and fixed upon the arbor, and they may be formed upon the adjacent edges of the two parts $g$ of a divided ferrule, as shown in Figs. 2 to 5. In this case the pawl will be of the form shown in Figs. 6 and 7; or the ratchet-teeth may be formed upon the ends of a continuous ferrule, $g^2$, as shown in Fig. 8, and in such case the teeth of the pawl will be of the form shown in Figs. 8 and 9.

The operation of the clutch mechanism thus constructed is as follows: Assuming that the gear, pulley, or other wheel $c$ is driven in the direction indicated by the arrow in Fig. 2, which will be the case in the application of the invention illustrated, when the machine is being moved backward, the inclined sides 1 of the teeth of the pawl will engage alternately with and be moved in opposite directions by the inclined sides of the teeth 2 of the ratchets upon the arbor, thereby reciprocating the pawl 4 and moving the teeth in a serpentine path, and no motion will be imparted to the arbor $b$, and as a consequence the cutter will remain idle.

It will be observed that the ratchets 2 are placed at such a distance from each other that as the pawl is acted upon by the inclined sides of a tooth of one ratchet and is thereby moved toward the other ratchet it enters the recess immediately in advance of one of the teeth of the last ratchet, and that as soon as the pawl has passed the point of the tooth it immediately engages with the inclined side of the next tooth upon the opposite ratchet and is thrown backward into the recess in front of the tooth it has just passed. From this it results that in whatever position the wheel $c$ is arrested the pawl will be in position, upon the wheel being moved in the opposite direction, to engage with a tooth upon one or the other of the ratchets and clutch the wheel to the arbor, so as to set the latter in motion.

The shaft or arbor proper, $b$, may be turned down, as shown in Fig. 4, so as to leave a space beneath the ratchet-teeth, as shown at 6, and this in some cases will be an advantage.

It is preferable to provide the two ratchets, as shown; but in some cases one of the ratchets may be omitted and a series of projections and recesses of any suitable form be provided which will operate to allow the pawl to pass the teeth of the single ratchet, but to move it into the recesses in front of the teeth of the ratchet.

What I claim is—

The combination, with the arbor $b$, having ratchet-teeth the engaging-faces of which lie parallel with said arbor, of the wheel $c$, turning on said arbor and having the recess 3, and the pawl sliding in said recess parallel with the arbor and engaging with said ratchet-teeth, substantially as described.

In testimony whereof I have hereunto set my hand in the presence of two subscribing witnesses.

J. W. HOBSON.

Witnesses:
T. H. PALMER,
J. J. KENNEDY.